Nov. 27, 1951          C. L. OTT          2,576,533
              COOKY CUTTING MACHINE
Filed Aug. 1, 1949                    7 Sheets-Sheet 1

INVENTOR.
Conrad L. Ott.
BY
ATTORNEYS.

Nov. 27, 1951 — C. L. OTT — 2,576,533
COOKY CUTTING MACHINE
Filed Aug. 1, 1949 — 7 Sheets-Sheet 2

FIG. 2

INVENTOR.
Conrad L. Ott.
BY
Harness, Dickey & Pierce
ATTORNEYS.

Nov. 27, 1951     C. L. OTT     2,576,533
COOKY CUTTING MACHINE
Filed Aug. 1, 1949     7 Sheets-Sheet 4

INVENTOR.
Conrad L. Ott.
BY
Harness, Dickey & Pierce
ATTORNEYS.

Nov. 27, 1951 — C. L. OTT — 2,576,533

COOKY CUTTING MACHINE

Filed Aug. 1, 1949 — 7 Sheets-Sheet 5

INVENTOR.
Conrad L. Ott.
BY
Harness, Dickey & Pierce
ATTORNEYS.

Nov. 27, 1951     C. L. OTT     2,576,533
COOKY CUTTING MACHINE Filed Aug. 1, 1949     7 Sheets-Sheet 7

INVENTOR.
Conrad L. Ott.
BY
Harness, Dickey & Pierce
ATTORNEYS.

Patented Nov. 27, 1951

2,576,533

UNITED STATES PATENT OFFICE 2,576,533

COOKY-CUTTING MACHINE

Conrad L. Ott, Saginaw, Mich., assignor to Baker Perkins Inc., Saginaw, Mich., a corporation of New York Application August 1, 1949, Serial No. 107,892

13 Claims. (Cl. 107—21)

This invention relates broadly to guillotine-type cutters of the type used for cutting jelly-filled strips into commercial lengths in the manufacture of fig bars, apricot bars, and the like. More particularly, the invention relates to means for cleaning the guillotine knife after each cutting operation without stopping or in any way slowing operation of the machine.

Jelly-filled cookies such as fig bars and apricot bars are formed and baked in continuous strips and are transported from the baking oven by suitable conveyor apparatus. As the strips are moved along by the conveyor the guillotine cutter embodying the present invention operates to cut the same into standard commercial lengths.

Because of the sticky, adhesive nature of the cooky filling, it must be cleaned from the knife after each cutting operation. Otherwise the knife cannot be removed from the strips without tumbling and disarranging the several cookies. Further, if the filling is permitted to accumulate on the knife it drips onto the cookies or strips after the knife is withdrawn. When this occurs, some of the cookies stick together and they are almost invariably broken or otherwise damaged when pulled apart.

An important object of the present invention is to provide means for cleaning the knife automatically after each cutting operation.

Another object of the invention is to provide a knife-cleaning mechanism having novel means for disposing of jelly removed from the knife.

Yet another object of the invention is to provide a knife-cleaning apparatus of the above-mentioned character wherein the cooky filling removed from the knife is collected under clean, sanitary conditions which permit the filling to be re-used.

Still another object of the invention is to provide a knife-cleaning mechanism which maintains the knife sufficiently clean at all times so that the jelly-filled strips are cleanly severed to form the cookies and are left in orderly rows on the conveyor.

In the drawings forming a part of this specification and wherein like numerals are employed to designate like parts throughout the same:

Fig. 3 is a transverse, vertical sectional view taken on the line 3—3 of Fig. 2;

Referring to the drawings, wherein for the purpose of illustration is shown a preferred embodiment of the invention, attention is first directed to Figs. 1–12 which show one form of the invention. In this form of the invention, the numeral 10 designates an oven of conventional construction in which the cookies are baked. In the form here shown the baking process is continuous and the cookies are discharged slowly from the oven at a uniform rate in the form of continuous strips 12. As perhaps best shown in Fig. 1, the cooky strips 12 are carried from the oven 10 on an endless conveyer 14 mounted on a suitable supporting structure 16. Usually a plurality of strips 12 are disposed side by side on the conveyer 12. The number of cooky strips in any particular instance depends upon the capacity of the oven 10 and its adjuncts. It is common practice, however, to bake a dozen or more cooky strips 12 at one time. The equipment here shown is adapted to accommodate twelve of the strips 12 side by side on the conveyer 14.

In order to cut the strips 12 into individual cookies (fig bars, apricot bars and the like), a guillotine knife is suspended above and transversely across the conveyor 14, and a mechanism is provided for raising and lowering the knife in timed relation with the movement of the conveyer so that the cuts are spaced a uniform distance apart. This mechanism also includes means for moving the knife laterally with and at the same rate of speed as the conveyer 14 during the cutting operation so that a clean cut is made without disarranging the strips 12 or the severed cookies. As suggested, mechanism also is provided for continuously removing any of the cooky filling that adheres to the knife, and this mechanism operates in such manner that the filling removed from the knife can be collected and re-used. This represents a substantial saving in the amount of filling used and consequently in production cost. In the apparatus here described, the saving amounts to about a gallon of filling per hour.

The knife-actuating mechanism is carried by a supporting frame comprising a horizontal base plate 18 having generally square, upright end plates 20 and 22 at opposite ends thereof. The base plate 18 extends transversely under the conveyer 14 and is bolted or otherwise fastened solidly on the framework of the supporting structure 16. End plates 20 and 22 preferably are bolted to the base plate 18 and are disposed at opposite sides of the conveyer 14. A suspension shaft 24 bridges end plates 20 and 22 and is journaled for rotary turning movement in bearings 26 and 28 on the end plates.

Figure 1:
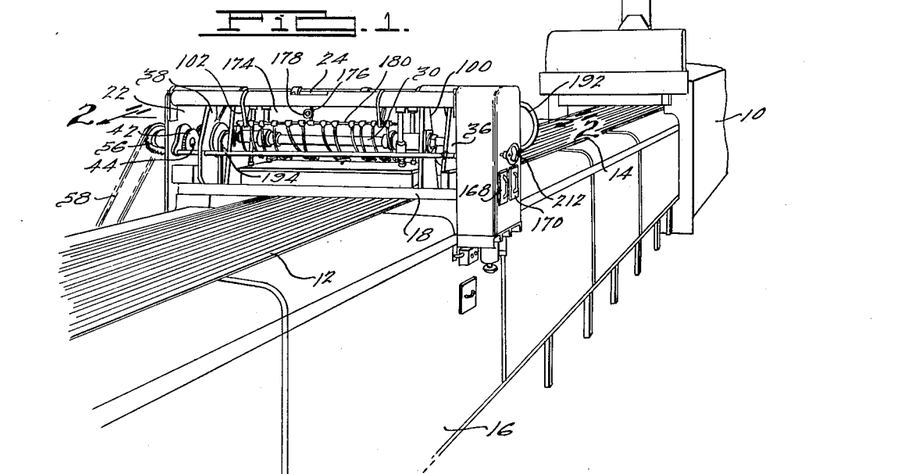
Fig. 1 is a fragmentary, perspective view showing knife-cleaning mechanism embodying the present invention associated with a guillotine knife-cutting apparatus and illustrating the whole disposed in operative association with the conveyor which transports the cooky strips from the baking oven.
Figure 8:
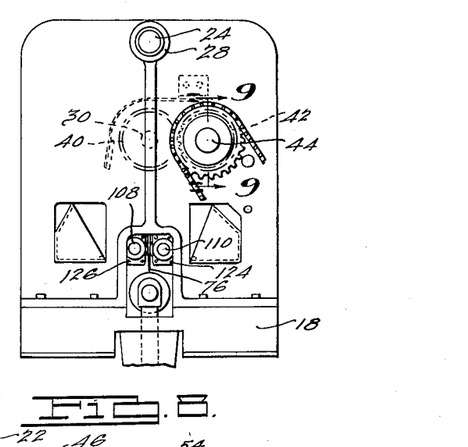
Fig. 8 is a right-hand end elevational view of the cooky-cutting mechanism when viewed as shown in Fig. 2.
Figure 9:
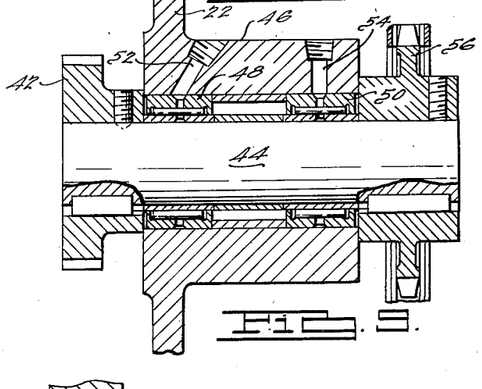
Fig. 9 is a fragmentary, longitudinal, vertical sectional view taken on the line 9—9 of Fig. 8.
Figure 10:
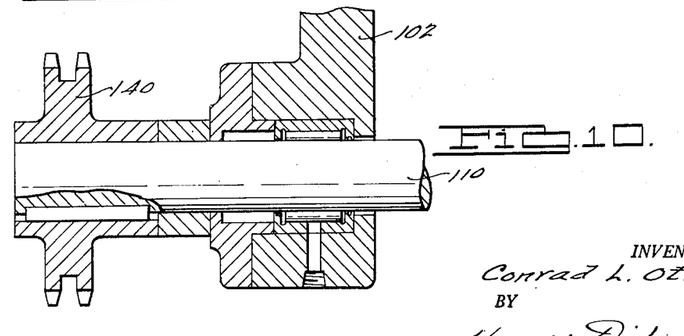
Fig. 10 is a fragmentary, longitudinal, vertical sectional view taken on the line 10—10 of Fig. 3.
Figure 11:
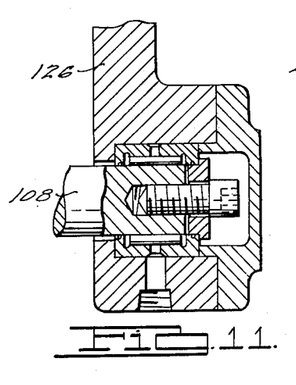
Fig. 11 is an enlarged, fragmentary, longitudinal, vertical sectional view taken on the line 11—11 of Fig. 3.
Figure 12:
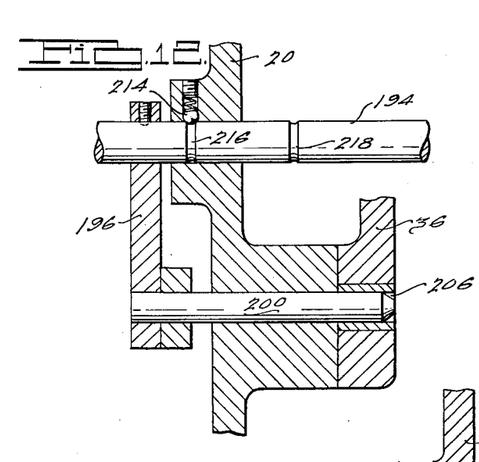
Fig. 12 is an enlarged, fragmentary, longitudinal, vertical sectional view taken on line 12—12 of Fig. 6.

A power-drive mechanism is suspended from the supporting framework described above and comprises a rotatably driven shaft 30 journaled at or adjacent its ends in suitable bearings 32 and 34 on bearing plates 36 and 38 respectively which are suspended from and keyed to the shaft 24. The end of shaft 30 supported by bearing plate 38 extends through bearing 34 and the projecting portion thereof carries a driven gear 40 which meshes with a driving gear 42 on a stub shaft 44 carried by the end-supporting plate 22 (Fig. 8). Stub shaft 44 is rotatably mounted in an embossment 46 on the end plate 22 and is supported for rotation in the embossment by spaced bearings 48 and 50 (Fig. 9). Both bearings 48 and 50 are lubricated through suitable ducts 52 and 54. The driving gear 42 is disposed at the inner side of end plate 22. The outer end of shaft 44 extends beyond the embossment 46 and carries a sprocket 56 which is connected to the driving sprocket of a motor or the like (not shown) by a chain 58 (Fig. 1). In operation, the shaft 30 is continuously driven at a predetermined speed which will operate the cutting knife in properly timed relation with the conveyer 14.

Figure 2:
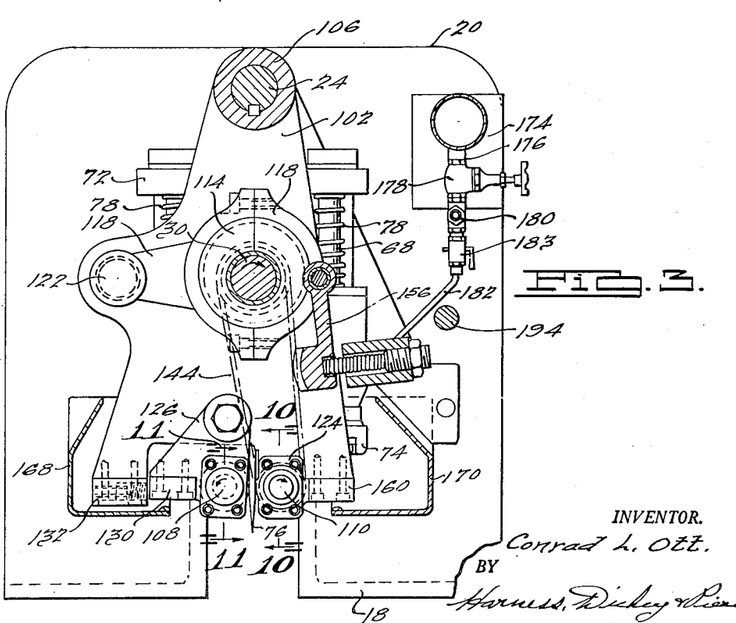
Fig. 2 is a vertical sectional view taken on the line 2—2 of Fig. 1 showing parts in section and parts broken away for clearness of illustration.

The knife-supporting mechanism is mounted on the drive shaft 30 substantially midway between and spaced substantially from the bearing plates 36 and 38. This mechanism comprises a pair of spaced bearings 60 and 62. On opposite sides of each bearing 60 and 62 and integrally attached thereto are bosses 64 and 66 which slidably support vertical shafts 68 and 70 respectively. The four rods 68 and 70 are arranged in generally rectangular formation. The upper ends of the rods 68 and 70 are connected by a tie plate 72 and the lower ends thereof are connected by a bed plate 74 which carries the knife 76. Springs 78 confined between the bosses 64 and 66 and tie plate 72 hold the knife-carrying framework normally disposed substantially as shown in Fig. 2. The bearings 60 and 62 are loosely mounted on shaft 30 so that the entire knife-carrying framework is free to oscillate or turn about the shaft, and the rods 68 and 70 are freely slidable in bosses 64 and 66 against the action of springs 78 so that the knife 76 can be raised or lowered at the same time that the supporting framework is oscillated. The knife 76 which may be tapered, hollow-ground, or of thin steel depends from and longitudinally bisects the bed plate 74, and it can be adjusted vertically within relatively small limits by set screws 78. Knife 76 extends entirely across the conveyer 14 and is adapted to be moved up and down against the action of springs 78 to cut the cooky strips 12.

In order to move knife 76 vertically relative to the conveyer 14, I provide a pair of eccentric cams 80 and 82 on the shaft 30 at the inner sides of and immediately adjacent bearings 60 and 62. The cams 80 and 82 are keyed for mutual rotation with drive shaft 30 and peripherally engage cam followers 84 and 86, respectively, which are on the bed plate 74. The cams 80 and 82 are identically positioned on the shaft 30 so that they act in unison, and they preferably hold the springs 78 under at least light tension when the portions of smallest radial dimension engage the followers 84 and 86. Thus as the long radius lobes of cams 80 and 82 move downwardly they progressively depress bed plate 74 against the action of springs 78 and lower the knife 76 to the conveyer 14 to sever the cooky strips 12. As the lobes of cams 80 and 82 move upwardly again, the preloaded springs 78 retract bed plate 74 and knife 76 is withdrawn from the cooky strips 12.

In practice, the knife 76 should just touch the conveyer belt 14 when at the lower limits of its downward travel to assure complete severance of the cookies. In order to assure proper relationship between the conveyer belt 14 and the knife 76, a vertically adjustable roller 88 is provided under the conveyer belt and directly below the knife. Adjustment of this roller moves the conveyer belt 14 relative to the knife 76 and permits relative positioning thereof so that the knife will completely sever the cooky strips without cutting into the conveyer. To this end the rotor 88 is carried by a shaft 90 which extends transversely of the conveyer belt 14 and is supported at its ends by conventional adjusting screw assemblies 92 and 94. It will be readily apparent that the rotor 88 can be adjusted vertically by the screw assemblies 92 and 94 to position the conveyer 12 properly relative to knife 76 and the adjusting screws in the assemblies are held in the selected adjusted position by lock nuts 96 and 98.

Figure 4:
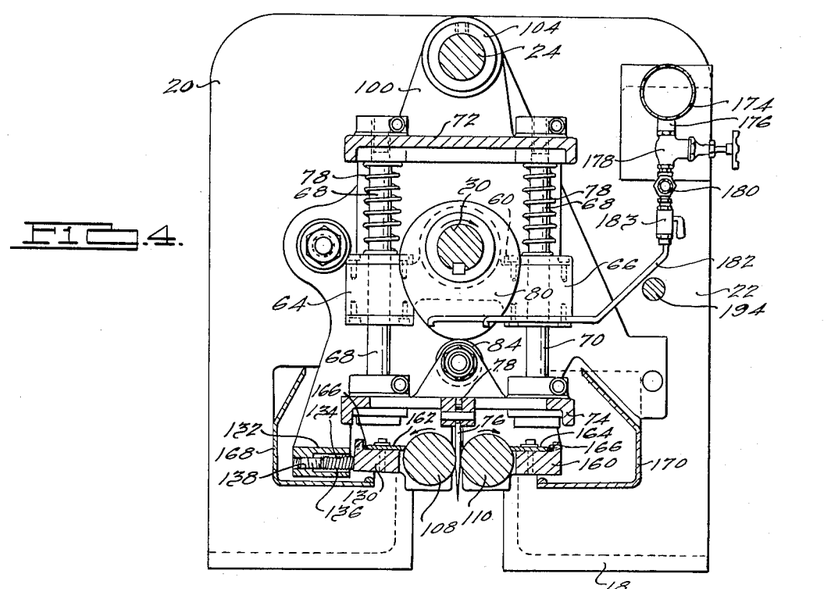
Fig. 4 is a transverse, vertical sectional view taken on the line 4—4 of Fig. 2.

In order to move knife 76 laterally with and at the same rate of speed as the cooky strips 12 during the cutting operation, a pair of cutter-frame plates 100 and 102 are suspended from the shaft 24 between bearing plates 36 and 38 and the adjacent ends of the knife-supporting structure. Plates 100 and 102 are formed with bearings 104 and 106 which loosely receive the shaft 24 so that the plates depend from and are swingable on the shaft. Drive shaft 30 extends through horizontal elongated slots 101 in the plates 100 and 102 and the plates are freely swingable on shaft 24 within limits defined by the slots. Rollers 108 and 110 carried by plates 100 and 102 are disposed at opposite sides of the knife 76 as shown in Fig. 4. The rollers press tightly against the knife so that lateral movement of the latter is controlled by swinging movement of the cutter-frame plates 100 and 102.

In order to swing the cutter-frame plates 100 and 102 to move knife 76 with the conveyer 14, a pair of eccentric cams 112 and 114 are mounted on the shaft 30 and keyed thereto for mutual rotation therewith. As perhaps best shown in Fig. 2, the eccentric cam 112 is disposed at the outer side of and immediately adjacent to the cutter frame plate 100, and the eccentric cam 114 is disposed at the outer side of and adjacent to the cutter-frame plate 102. Eccentric straps 116 and 118 are mounted on cams 112 and 114 respectively. The straps 116 and 118 have radial arms which are fastened to respective cutter-frame plates 100 and 102 by pivots 120 and 122. The two cams 112 and 114 are identically positioned on the shaft 30 so that they move the two plates 100 and 102 in unison and the speed of rotation of shaft 30 is such that the knife 76 moves in the same direction as and in timed relation with the conveyer belt 14.

Figure 5:
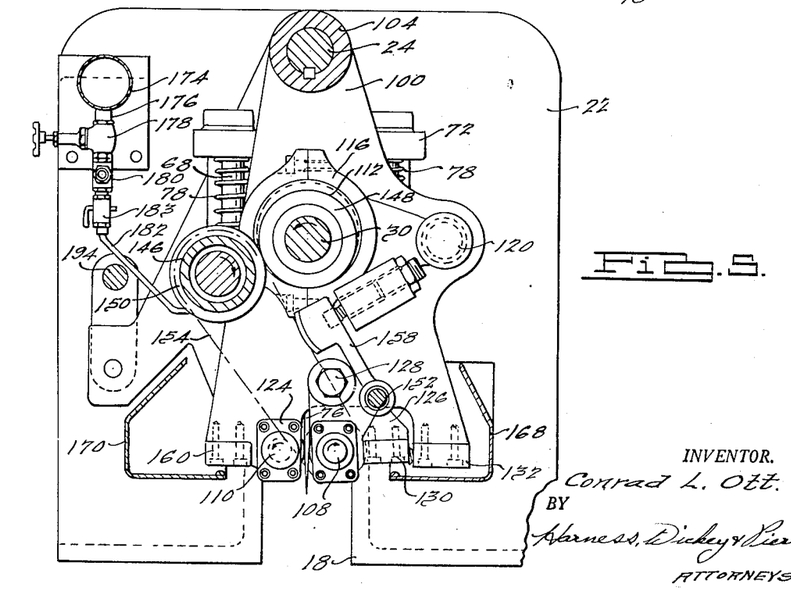
Fig. 5 is a transverse, vertical sectional view taken on the line 5—5 of Fig. 2.
Figure 6:
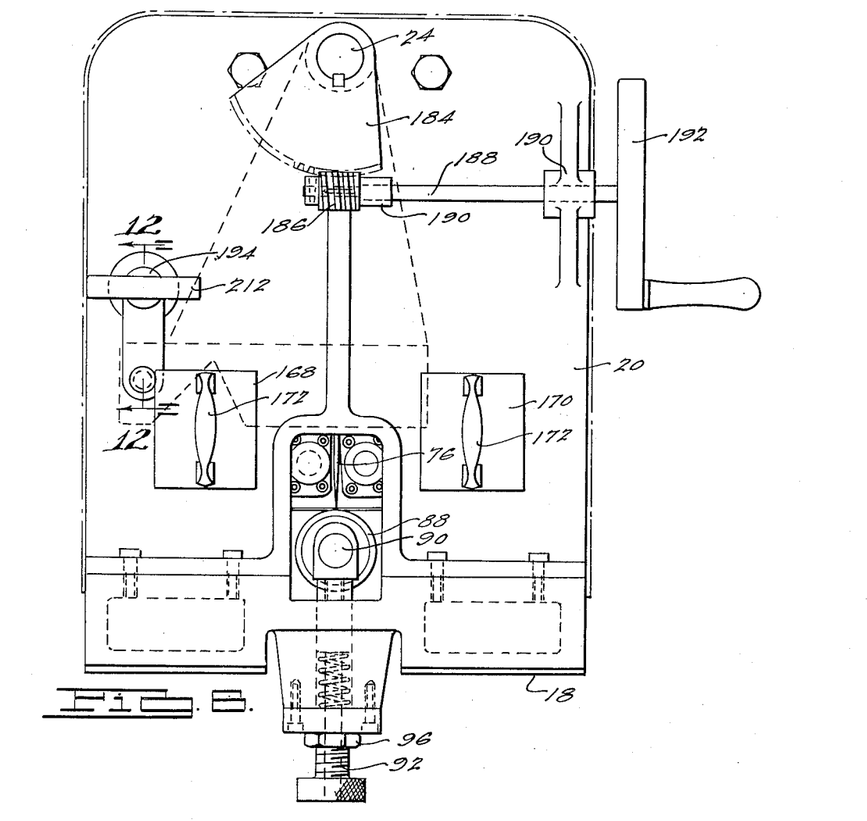
Fig. 6 is a left-hand end elevational view of the cooky-cutting mechanism when viewed as shown in Fig. 2.
Figure 7:
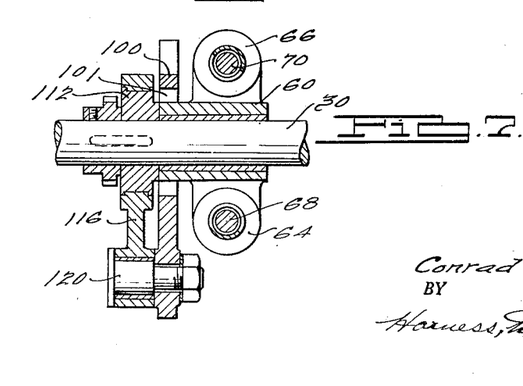
Fig. 7 is a fragmentary, longitudinal sectional view taken on the line 7—7 of Fig. 2.

In addition to transmitting movement from the cutter-frame plates 100 and 102 to the knife 76, rollers 108 and 110 remove any filling which adheres to the knife as a result of the cutting operation. The successful performance of this function requires pressed engagement between the rollers 108 and 110 and the knife 76 at all times. To this end, roller 110 is journaled in fixed bearings 124 carried by plates 100 and 102 (Fig. 5). Roller 108, on the other hand, is journaled in swingable bearings 126 which are fastened to plates 100 and 102 by pivots 128. To assure contact of the cleaning rollers 108 and 110 for the entire width of the tapered knife 76 during reciprocation of the latter, roller 108 is spring-pressed in the direction of the knife at all times. In this connection it will be observed that the two brackets 126 are connected by a longitudinal bar 130 and the cutter-frame plates 100 and 102 are similarly connected by a bar 132. As perhaps best shown in Figs. 4 and 5, the two bars 130 and 132 are arranged one behind the other and in generally parallel relation. Recesses 134 are provided at spaced points along the inner side of bar 132, and springs 136 in the recesses bear against the confronting outer edge of bar 130. Pressure exerted by springs 136 against the bar 130 is controlled by adjusting screws 138.

In order to remove filling adhering to the knife 76, rollers 108 and 110 are rotated in opposite directions as indicated by the arrows in Fig. 4, so that the contacting surfaces thereof wipe upwardly across the knife. Roller 110 is rotatably driven by a sprocket 140 on one end thereof and this sprocket is connected to a second sprocket 142 on drive shaft 30 by an endless chain 144. Roller 108 is rotatably driven in substantially the same manner, except that an idler gear 146 is interposed in the drive to reverse the rotation of the roller. In this connection it will be observed that the idler gear 146 is journaled on the end bearing plate 36 and meshes with a gear 148 on the drive shaft 30. Fixed to and rotatable with idler gear 146 is a socket 150 which is connected by an endless chain 154 to a sprocket 152 on the end of rotor 108. Thus rotation of drive shaft 30 simultaneously rotates rollers 108 and 110 in opposite directions, and as the rollers rotate they wipe away any filling that adheres to the knife. In order to assure complete removal of the filling, the knife 76 preferably is retracted until the edge thereof is substantially on a line connecting the centers of rollers 108 and 110, and adjustment of the knife for this purpose can be had through the medium of adjusting screws 78. Endless chains 144 and 154 can be selectively tensioned by pivoted, conventional tighteners 156 (Fig. 3) and 158 (Fig. 5) respectively.

In order to remove and collect filling from rollers 108 and 110, a second bar 160 is fastened to and between end plates 100 and 102 behind roller 110, and scrapers 162 and 164 are fastened on the bars 130 and 160 with the scraping edges thereof bearing lightly against the outer or rearward sides of the rollers (Fig. 4). Scrapers 162 and 164 preferably are made of a nonmetallic, textile substance to prevent scoring of the rollers 108 and 110. Also, scrapers 162 and 164 preferably are adjustable relative to the rollers 108 and 110 and are held in selected adjusted positions by back-up screws 166. It will be readily apparent that filling removed from the knife 76 by rollers 108 and 110 will be carried upwardly and rearwardly on the surfaces of the rollers and removed therefrom by the scrapers 162 and 164. Filling recovered by the scrapers 162 and 164 is collected in elongated pans 168 and 170 which extend into the device through suitable openings in the end plate 20. The pans 168 and 170 may be supported at suitable points along the length thereof in any convenient manner and the outer ends thereof preferably are provided with handles 172 for convenience in handling.

To prevent the jelly from baking on knife 76 and cleaning rollers 108 and 110 due to heat developed as a result of friction created in operation, the rollers are lubricated by water or a suitable edible oil. To this end a storage tank 174 is positioned above the rollers 108 and 110. The tank 174 here shown is rectangular in transverse section and the ends thereof are fastened to the supports 20 and 22. Lubricant is discharged from the tank 174 through a pipe 176 controlled by valve 178 into a manifold 180 where it is distributed to a plurality of drip pipes 182 which are individually controlled by valves 183. As perhaps best shown in Fig. 2, the manifold 180 extends the full length of rollers 108 and 110, and the drip pipes 182 are arranged in spaced relation along the manifold so as to lubricate the full length of the rollers.

When the parts are disposed above and in operative association with the conveyer 12 in the manner hereinabove described, the knife 76 and related parts which become covered with the filling are relatively inaccessible and thus difficult to clean. Accordingly, I have provided means for swinging the entire mechanism so that it extends horizontally from the shaft 24. When thus positioned, the parts are readily accessible for cleaning. Also, in the raised position the cutting mechanism is remote from the conveyer 12. Positioning of the cutting mechanism in this manner is desirable whenever the equipment is used to bake goods which do not require cutting by the guillotine knife. When in the raised position, the cutting mechanism preferably is disconnected from the driving source for obvious reasons.

In connection with the foregoing, it will be observed that a gear quadrant 184 is mounted on and keyed to the end of the shaft 24 which projects beyond end plate 20. This quadrant 184 meshes with a worm 186 on a horizontal shaft 188 carried by suitable supporting brackets 190 on the end plate 20. Shaft 188 extends transversely of the support 20 and a hand wheel 192 is fastened on one end thereof. Manual rotation of hand wheel 192 moves quadrant 186 and shaft 124 ninety degrees to swing the apparatus between raised and lowered positions. In this connection it will be recalled that bearing shafts 36 and 38 are keyed to shaft 24 so that they rotate with the shaft. Since all of the operating parts of the cutting mechanism are either carried by or movable with the plates 36 and 38, rotation of the shaft 24 in the manner described moves all of the cutting mechanism. As the mechanism swings from the lowered to raised position, driven gear 54 automatically disengages driving gear 42 to disconnect the cutter mechanism from the power source.

In order to lock the cutting mechanism in its lowered operative position, a rod 194 is slidably mounted in suitable openings provided in end plates 20 and 22. The rod 194 preferably is located a substantial distance at one side of the cutter mounting and actuating mechanisms so as not to interfere with the same and in such relation to this mechanism that the latter swings away from the rod when rotated to the raised position. A radial arm 196 is fastened to the rod 194 at the outer side of end plate 20, and a second radial arm 198 is fastened to the rod intermediate plates 38 and 102. Pins 200 and 202 carried by arms 196 and 198 respectively fasten the plates 36 and 38 to the main supporting frame when the cutting mechanism is operatively disposed. In this connection it will be observed that the pin 200 extends through an embossment 204 on end plate 20 and into an opening 206 in plate 36. Pin 202, on the other hand, extends through an opening 208 in arm 36 and a projecting portion thereof is received in an embossment 210 on end plate 22. A handle 212 on the end of rod 194 facilitates manual manipulation of the same to move pins 200 and 202 into and out of engagement with plates 36 and 38. In the drawings the pins 200 and 202 are shown engaged with plates 36 and 38, but it will be readily apparent that if the handle 212 is pulled in the direction of the arrow in Fig. 2, the pins can be retracted to disengage the same. Rod 194 is held in either advanced or retracted position by a spring-pressed ball detent 214 (Fig. 12) which enters one or the other of peripheral grooves 216 and 218 in the rod.

Figures 13, 14, 15, 16:
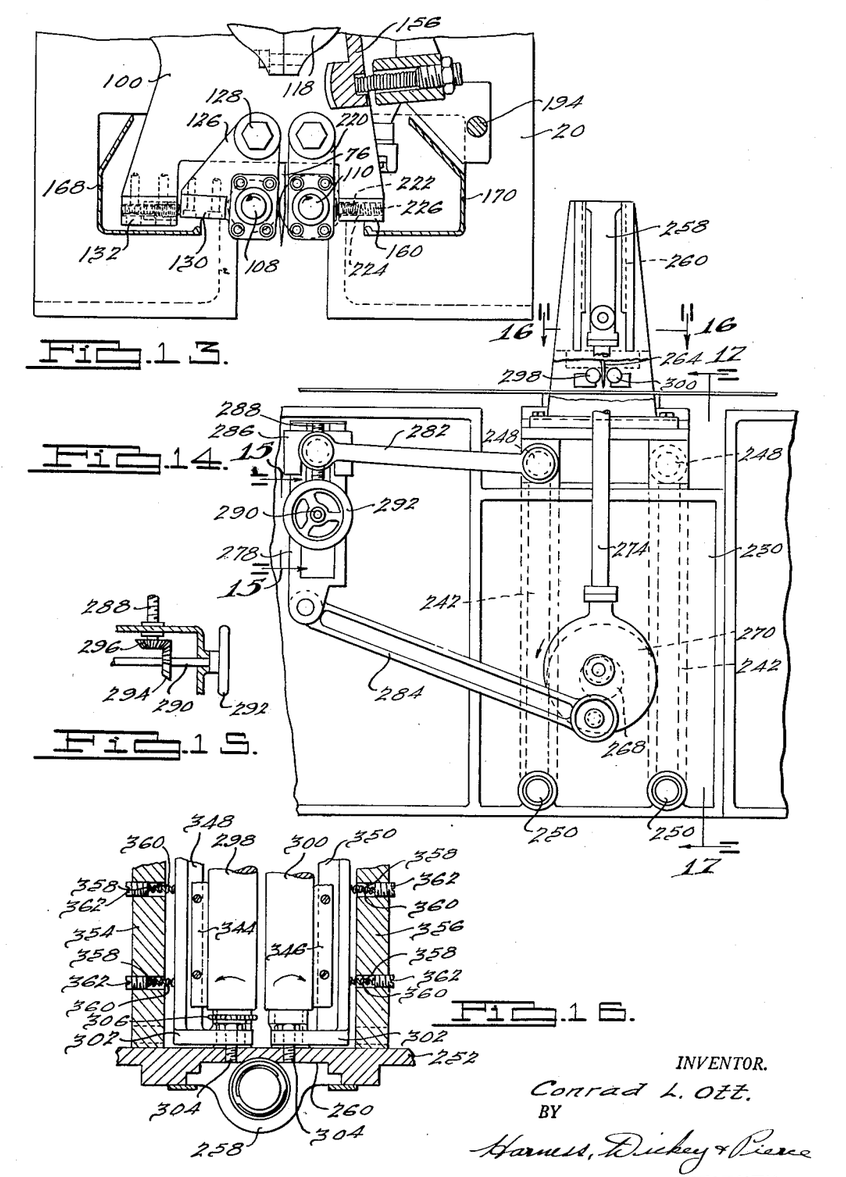
Fig. 13 is a transverse, vertical sectional view showing a modified construction for mounting the cleaning rollers.
Fig. 14 is a side elevational view showing a modified mechanism for driving the cleaning rollers.
Fig. 15 is a fragmentary view taken on the line 15—15 of Fig. 14.
Fig. 16 is a fragmentary, horizontal sectional view taken on the line 16—16 of Fig. 14.
Figure 17:
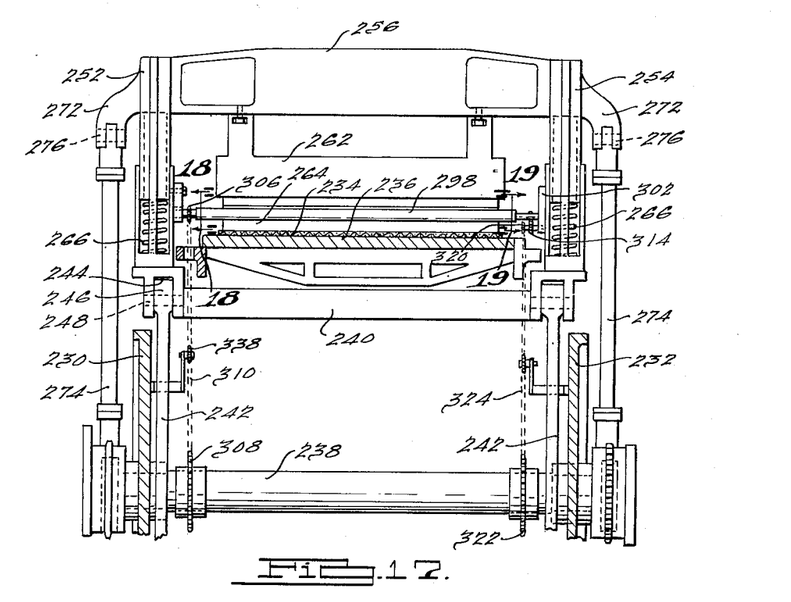
Fig. 17 is a vertical sectional view taken on the line 17—17 of Fig. 14.

Reference is now had to Fig. 13 which shows a modified mounting for rollers 108 and 110. In this form of the invention both rollers 108 and 110 are carried by pivoted brackets which are fastened to plates 100 and 102 and both spacer bars 132 and 160 carry springs which urge the rollers against knife 76. In the form of the invention here shown, roller 108 is carried by pivoted brackets 126 which are identical in construction to those hereinabove described. Roller 110, on the other hand, is carried by pivoted brackets 220 on plates 100 and 102. Springs 222 in recesses 224 provided in the inner edge of spacer bar 160 bear against the brackets 220 to hold the roller 110 in pressed engagement with the knife 76, and the springs are selectively tensioned by adjusting screws 226 to regulate the pressure exerted by the roller against the knife.

Reference is now had to Figs. 14–19 which show a modified structure for supporting and actuating the cutting knife. In this form of the invention, the entire mechanism is carried by a main supporting frame having upright stationary members 230 and 232 at opposite sides of the conveyer belt 234 and a top panel 236 for supporting the conveyer belt immediately below the cutting knife. Below the conveyer belt 234 and rotatably supported by upright members 230 and 232 is a horizontal drive shaft 238 which may be rotatably driven in any suitable or conventional manner (not shown).

The cutting head comprises a generally rectangular, horizontal frame 240 which is disposed below the conveyer and is supported at each of the four corners thereof by vertical, pivoted links 242. As perhaps best shown in Fig. 17, the corners of frame 240 are provided with sockets 244 which receive the upper end 246 of links 242. Horizontal pivots 248 fasten the ends 246 to the frame 240. At the lower ends thereof links 242 are fastened to the upright frame members 230 and 232 by horizontal pivots 250 (Fig. 14). Inasmuch as the four links 242 are of the same length, they collectively define parallel linkages which permit the frame 240 to rock back and forth under the conveyer 234 and to move in the same direction as the conveyer. At opposite sides of the frame 240 are upright side frame members 252 and 254 which embrace and extend substantially above the conveyer 234. These side frame members 252 and 254 carry the main supporting frame which includes a crosshead 256 having guides 258 at opposite ends thereof which fit in ways 260 in frame members (Fig. 16). Fastened to and depending from the crosshead 256 is a frame 262 which carries the knife 264. As clearly shown in the drawings, the cutting edge of the knife 264 is arranged precisely parallel to the conveyer 234, and suitable provision is made for moving the same with respect to the conveyer as in the form of the invention first described. The crosshead assembly which carries the cutting knife 264 is supported at opposite ends thereof by springs 266 disposed under the guides 258 and between the arms of end framed members 252 and 254.

Vertical reciprocation of the knife 264 relative to conveyer belt 234 is accomplished by eccentrics 268 which are mounted on and fixed to the power shaft 238 at the outer sides of supporting frame members 230 and 232. The eccentrics 268 carry eccentric straps 270, and the latter are connected to arms 272 which extend outwardly from the ends of crosshead 256 by connecting rod 274. In order to accommodate the oscillatory motion of connecting rods 274 due to rotation of eccentrics 268, the rods are fastened to arms 272 by pivots 276. As a result of the above construction and arrangement of parts the knife 264 is reciprocated once for each rotation of the power shaft 238.

Lateral movement of the knife 264 is effected by a mechanism which rocks the parallel linkages 242 back and forth in timed relation with vertical movement of the knife 264. More specifically, a pair of vertical links 278 are mounted at opposite sides of the conveyer 234 for oscillatory movement about horizontal pivots 280 on the supporting framework of the apparatus. The upper ends of links 278 are connected to pivots 248 by connecting rods 282, and the lower ends of the links are connected to eccentric straps 270 by connecting rods 284. Thus, rotation of eccentrics 268 acts through eccentric strap 270 and connecting rods 284 to oscillate links 278 about pivots 280, and the latter in turn act through connecting rods 282 to rock the supporting frame 240 and its adjuncts back and forth parallel to the direction of travel of conveyer 234. The vertical and horizontal movements of knife 264 are correlated so that the knife moves with and at the same rate of speed as the conveyer during the cutting operation. In this manner the individual cookies are severed without disarranging the same on the conveyer.

The distance knife 264 is moved horizontally during each cutting operation and thus the length of the cookies severed thereby is controlled by an adjustable connection between the links 278 and connecting rod 282. In the form of the invention here shown, this connection is in the form of nuts 286 mounted on vertical screws 288. Nuts 286 carry the pivots which fasten the adjacent ends of connecting rods 282, and screws 288 are rotatable but axially fixed. Stub shafts 290 carried by links 278 are manually rotated by handwheels 292 and are connected to screws 288 by bevel gears 294 and 296 (Fig. 15). It will be readily apparent that rotation of handwheels 292 raises and lowers nuts 286 and that adjustment of the nuts in this manner will alter the distance knife 264 is moved horizontally during each cutting operation.

In this form of the invention the cleaning rollers 298 and 300 are disposed at opposite sides of the knife 264, and the ends of the rollers are carried by supporting brackets 302 which are fastened to the end frame members 252 and 254 by suitable pivots 304. Thus, each roller is carried by parallel supporting brackets 302, and two brackets in each pair are pivoted to opposite end frame members 252 and 254. Roller 298 carries a sprocket 306 which is connected to a driving sprocket 308 on the power shaft 238 by an endless belt 310. This arrangement drives roller 298 in the direction of the arrow in Fig. 18 so that the roller wipes upwardly across knife 264 to remove any of the filling which adheres thereto as a result of the cutting operation. The other roller 300 is rotated in the direction of the arrow in Fig. 18 so that it also wipes upwardly across knife 264 to remove filling or other substances adhering thereto. Thus, the roller 300 is driven in a reverse direction to roller 298. To this end roller 300 carries a gear 312 which meshes with a gear 314 on a stub shaft 316 carried by a downward extension 318 on the adjacent mounting bracket 302. Associated with the gear 314 is a driven sprocket 320 which is connected to a driving sprocket 322 on the power shaft 238 by an endless chain 324.

Figures 18, 19:
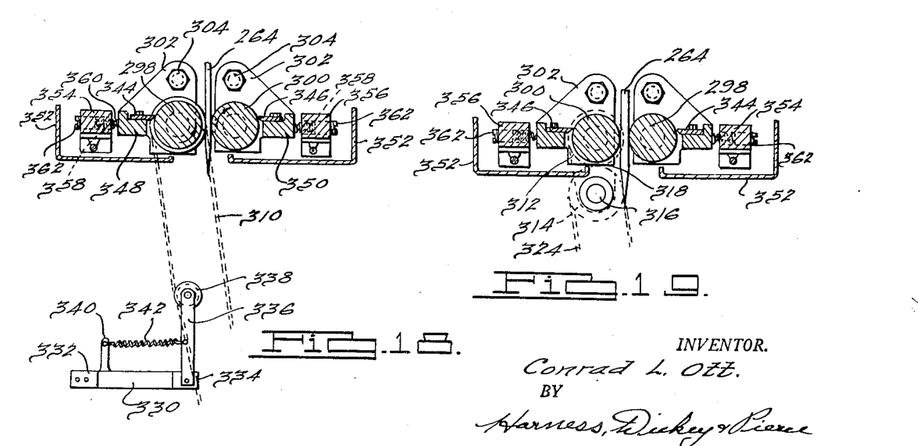
Fig. 18 is a fragmentary, enlarged, vertical sectional view taken on the line 18—18 of Fig. 17.
Fig. 19 is a fragmentary, enlarged, vertical sectional view taken on the line 19—19 of Fig. 17.

As the distance between driven sprockets 306 and 320 and drive sprockets 308 and 322 varies during reciprocation of the knife 264, it is necessary to provide mechanism for maintaining the driving chains 310 and 324 taut at all times. To this end, each of the chains 310 and 324 is provided with a suitable chain-tightening device. One type of chain-tightening device that has been found to be satisfactory is shown in Fig. 18.

The particular chain-tightening device here shown comprises a generally V-shaped mounting bar 330 which is attached at the end 332 thereof to the main supporting frame of the apparatus. Mounted on the opposite end 334 of the bar 330 is an upright pivoted arm 336 which carries a roller 338 positioned for peripheral engagement with a run with the endless chain with which it is associated. Behind the pivoted arm 336 is an upstanding rigid arm 340, and a spring 342 is connected at one end to the arm 340 and at the other end thereof to the arm 336 above the pivot which connects the same to the mounting bar 330. Spring 342 constantly urges the roller 338 against the endless chain with which it is associated to hold the chain taut at all times.

Filling or other substances removed from the knife 264 by rollers 298 and 300 is in turn removed from the rollers by scrapers 344 and 346. These scrapers extend the full length of the rollers and, as shown in Fig. 18, the scrapers are supported by mounting bars 348 and 350 respectively fastened at the ends thereof to respective pairs of mounting brackets 302. Filling removed from rollers 298 and 300 by scrapers 344 and 346 is collected in pans 352 which are positioned and supported generally in the manner described in connection with the first form of the invention.

In order to hold the rollers 298 and 300 in pressed engagement with the knife 264 stationary, elongated supports 354 and 356 are provided behind the mounting bars 348 and 350. At spaced points along the lengths of supports 354 and 356 are openings 358 which receive springs 360. As shown in the drawings, the springs 360 project from the openings in which they are mounted, and the projecting portions thereof seat against the scraper supporting bars 348 and 350. Back-up screws 362 in openings 358 behind springs 360 permit the springs to be selectively tensioned to regulate the pressure exerted by the scrapers against the rollers 298 and 300 and by the rollers against the knife 264.

In operation, the apparatus last described is substantially identical to the form of the invention first described and it accomplishes substantially the same purposes in essentially the same way.

It will thus be seen that I have achieved the objects of my invention. I have provided a cooky-cutting apparatus that operates efficiently to cut elongated jelly-filled strips into individual cookies and that is adjustable to regulate the size of the cookies. The cutting knife is uniquely mounted and actuated to move with the cooky strips during the cutting operation so as to make a clean, neat severance. In addition, I have provided means which travel with the knife for keeping the latter clean and free at all times from the sticky, adhesive cooky filling. The filling removed from the knife is recovered automatically in condition for re-use. This filling is relatively expensive and the filling collected from the knife represents a substantial saving in the filling and in the ultimate cost of the cookies.

Having thus described the invention, I claim:

1. In a cooky-cutting machine of the type having a vertically reciprocable and laterally movable knife, the improvement comprising cleaning rollers mounted to move laterally with and on opposite sides of said knife, means for moving at least one of the rollers laterally relative to the knife, means holding said rollers in pressed engagement with the knife, and means for rotatably driving said rollers so that the engaged surfaces thereof wipe upwardly across said knife.

2. In a cooky-cutting machine of the type having a vertically reciprocable and laterally movable knife, the improvement comprising cleaning rollers disposed on opposite sides of said knife, pivoted mountings holding said rollers vertically sationary so that the knife reciprocates relative thereto but permitting said rollers to move laterally with the knife, means acting against at least one of said mountings for holding the rollers in pressed engagement with the knife, a drive shaft, and means interconnecting said drive shaft and said rollers for rotatably driving said rollers so that the engaged surfaces thereof wipe upwardly across the knife.

3. In a cooky-cutting machine of the type having a vertically reciprocable and laterally movable knife, the improvement comprising a pair of cleaning rollers disposed on opposite sides of said knife, mountings carrying said rollers, the mountings for at least one of the rollers being shiftable to permit said roller to move laterally relative to the knife, and resilient means co-operable with said shiftable mountings to hold the roller associated with such mountings pressed against said knife, a drive shaft, driving sprockets on said drive shaft, driven sprockets on said rollers, and endless chains interconnecting said drive and driven sprockets for rotatably driving said rollers in opposite directions so that the engaged surfaces thereof wipe upwardly across said knife.

4. In a cooky-cutting machine of the type having a vertically reciprocable and laterally movable knife, a support mounted for independent horizontal movement relative to said knife, cleaning rollers carried by said support and disposed on opposite sides of said knife, spring means holding said rollers pressed against said knife, a rotary drive, and means interconnecting said drive and said rollers for rotatably driving said rollers in opposite directions so that the engaged surfaces thereof wipe upwardly across said knife.

5. In a cooky-cutting machine of the type having a vertically reciprocable and laterally movable knife, the improvement comprising cleaning rollers on opposite sides of said knife, at least one of said rollers being independently laterally movable relative to said knife, spring means holding said rollers normally in pressed engagement with the knife, a rotary drive, and means interconnecting said drive and said rollers for rotatably driving said rollers in opposite directions so that the engaged surfaces thereof wipe upwardly across said knife.

6. In a cooky-cutting machine of the type having a vertically reciprocable and laterally movable knife, the improvement comprising cleaning rollers on opposite sides of said knife, at least one of said rollers being independently laterally movable relative to said knife, spring means holding said rollers normally in pressed engagement with the knife, and a drive for rotatably driving said rollers in opposite directions so that the engaged surfaces thereof wipe upwardly across said knife to maintain the same free of substances adhering thereto in use.

7. In a cooky-cutting machine of the type having a vertically reciprocable and laterally movable knife, the improvement comprising cleaning rollers on opposite sides of said knife, at least one of said rollers being independently laterally movable relative to said knife, spring means holding said rollers normally in pressed engagement with the knife, a drive means, and means interconnecting said drive means and said rollers for rotatably driving said rollers in opposite directions so that the engaged surfaces thereof wipe upwardly across said knife to maintain the same free of substances adhering thereto in use, and scrapers associated with said rollers for removing substances removed thereby from said knife.

8. In a cooky-cutting machine of the type having a vertically reciprocable and laterally movable knife, the improvement comprising cleaning rollers on opposite sides of said knife, at least one of said rollers being independently laterally movable relative to said knife, spring means holding said rollers normally in pressed engagement with the knife, means for rotatably driving said rollers in opposite directions so that the engaged surfaces thereof wipe upwardly across said knife to maintain the same free of substances adhering thereto in use, scrapers associated with said rollers for removing substances removed thereby from said knife, and pans under said scrapers for collecting substances removed from the rollers by said scrapers.

9. In a cooky-cutting machine of the type having a knife, mounting means supporting said knife for independent vertical reciprocation and lateral swinging movement, drive means for vertically reciprocating said knife, the improvement comprising means serving a double function of swinging said knife laterally in timed relation with said vertical reciprocation and of removing substances adhering to said knife in use, said last-mentioned means comprising a pair of rollers on opposite sides of said knife, means holding said rollers in pressed engagement with the knife, means for rotatably driving said rollers in opposite directions so that the engaged surfaces thereof wipe upwardly across the knife, and means for swinging said rollers through a predetermined arcuate path in timed relation with the reciprocations of said knife.

10. In a cooky-cutting machine of the type having a knife, mounting means supporting said knife for independent vertical reciprocation and lateral swinging movement, drive means for vertically reciprocating said knife, the improvement comprising means serving the double function of swinging said knife laterally in timed relation with said vertical reciprocations and of removing substances adhering to said knife in use, said last-mentioned means comprising a pair of rollers on opposite sides of said knife, means holding said rollers in pressed engagement with the knife, means for rotatably driving said rollers in opposite directions so that the engaged surfaces thereof wipe upwardly across the knife, and means for imparting back-and-forth movement to said rollers and through said rollers to said knife so that the latter is moved laterally in timed relation with said independent vertical reciprocations.

11. In a cooky-cutting machine of the type having a knife, mounting means supporting said knife for vertical reciprocation and horizontal, back-and-forth movement, the improvement comprising a pair of rollers on opposite sides of said knife, means supporting said rollers for back-and-forth movement, means holding said rollers pressed against said knife so that back-and-forth movement of the rollers is transmitted to the knife, drive means for vertically reciprocating the knife independently of said rollers, separate drive means for moving said rollers and said knife back and forth in timed relation with said vertical reciprocation, and means for simultaneously and continuously rotatably driving said rollers in opposite directions so that the engaged surfaces of the latter wipe upwardly across the knife.

12. In a cooky-cutting machine of the type having a knife, mounting means supporting said knife for vertical reciprocation and horizontal, back-and-forth movement, the improvement comprising a pair of rollers on opposite sides of said knife, means supporting said rollers for back-and-forth movement, means holding said rollers pressed against said knife so that back-and-forth movement of the rollers is transmitted to the knife, drive means for vertically reciprocating the knife independently of said rollers, separate drive means for moving said rollers and said knife back and forth in timed relation with said vertical reciprocations, means for simultaneously and continuously rotatably driving said rollers in opposite directions so that the engaged surfaces of the latter wipe upwardly across the knife to remove substances adhering thereto as the result of cutting operations, and scrapers disposed behind said rollers and having edgewise engagement therewith to remove substances wiped from the knife by said rollers.

13. In a cooky-cutting machine, of the type having a knife, mounting means supporting said knife for vertical reciprocation and horizontal back-and-forth movement, the improvement comprising a pair of rollers on opposite sides of said knife, resilient means supporting said rollers for back-and-forth movement, means holding said rollers pressed against said knife so that back-and-forth movement of the rollers is transmitted to the knife, drive means for vertically reciprocating the knife independently of said rollers, separate drive means for moving said rollers and said knife back and forth in timed relation with said vertical reciprocations, means for simultaneously and continuously rotatably driving said rollers in opposite directions so that the engaged surfaces of the latter wipe upwardly across the knife to remove the substances adhering thereto in use, scrapers disposed behind said rollers and having edgewise engagement therewith to remove substances wiped from the knife by said rollers, and removable pans disposed below said scrapers for collecting substances removed from the rollers by said scrapers.

CONRAD L. OTT.

REFERENCES CITED

The following references are of record in the file of this patent:

UNITED STATES PATENTS

| Number | Name | Date |
|---|---|---|
| 1,747,954 | Rydberg | Feb. 18, 1930 |
| 1,831,826 | Sergent | Nov. 17, 1931 |
| 2,112,443 | Martoccio | Mar. 29, 1938 |